Figure 1:
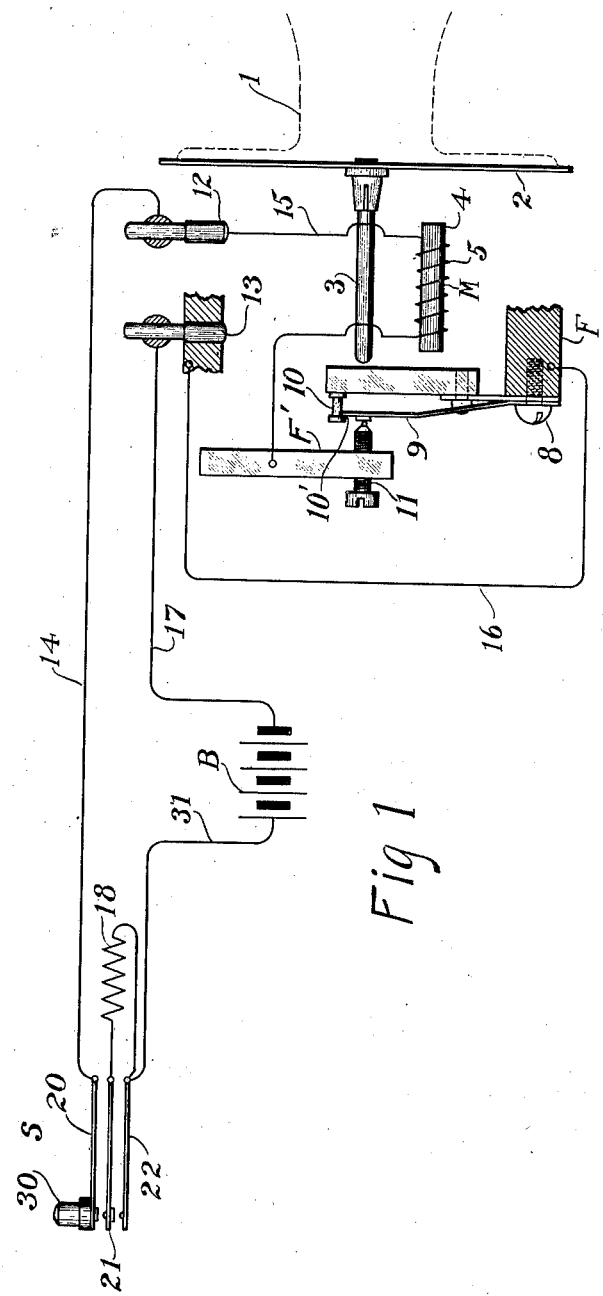

R. H. MANSON.
SIGNALING DEVICE.
APPLICATION FILED OCT. 3, 1910.

1,016,699.

Patented Feb. 6, 1912.
2 SHEETS—SHEET 1.

Witnesses
Edgar J. Spurr
A. D. T. Libby

Inventor
Ray H. Manson
By J. O. Richey
His Attorney

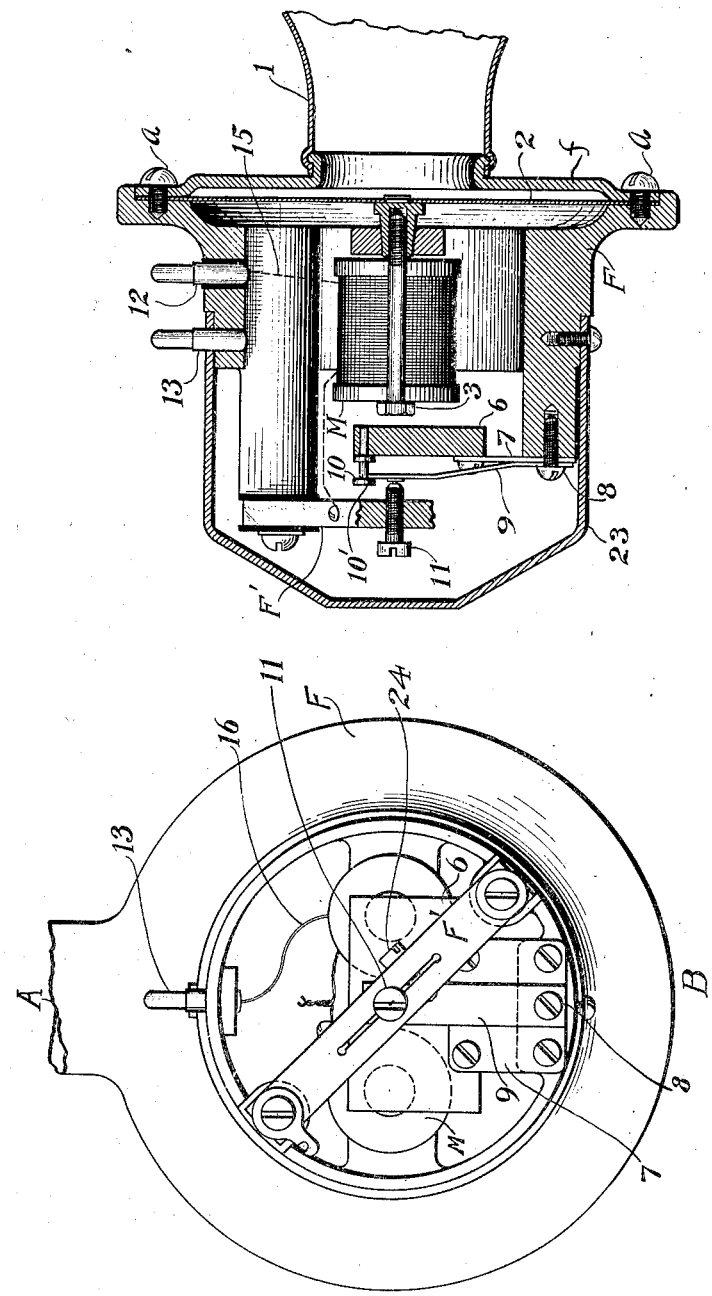

UNITED STATES PATENT OFFICE.

RAY H. MANSON, OF ELYRIA, OHIO, ASSIGNOR TO THE DEAN ELECTRIC COMPANY, OF ELYRIA, OHIO, A CORPORATION OF OHIO.

SIGNALING DEVICE.

1,016,699.     Specification of Letters Patent.     Patented Feb. 6, 1912.

Application filed October 3, 1910. Serial No. 585,005.

*To all whom it may concern:*

Be it known that I, RAY H. MANSON, a citizen of the United States, residing at Elyria, in the county of Lorain and State of Ohio, have invented certain new and useful Improvements in Signaling Devices; and I do hereby declare the following to be a full, clear, and exact description of the invention, such as will enable others skilled in the art to which it appertains to make and use the same.

My invention relates to a class of signaling devices which are employed on vehicles or boats to give warning of the approach thereof, though I do not wish to be limited to these especial uses, as my device is adapted to serve as a signal upon light-houses as a fog signal, and for other kindred purposes. I have shown an electrically operated device, though I do not wish to be limited thereto, as I contemplate operating my signal through any convenient means.

It is well known that at times it is necessary to employ a signaling device which will sound a startling signal, while at other times, it is necessary to produce only a signal to indicate the presence of an approaching vehicle. For example, in crowded city streets where the vehicle is progressing at a low rate of speed, it is desirable to sound a signal of low tone. In fact, loud signals are prohibited in many jurisdictions. On the other hand, upon country roads, where a machine is approaching rapidly, it is necessary to sound a signal from a distance, there being no traffic to interfere with, a loud signal is most desirable.

It is one of the objects of my invention to produce a device which will sound signals of different characters preferably of different degrees of loudness, and another object of my invention is to produce a signal which may be controlled by the driver from his position. In the particular form shown, the controlling device may be placed upon the steering wheel so that the driver may operate the device and at the same time use both hands in controlling the machine. Of course, my invention is not limited to this arrangement.

Another object of my invention is to so arrange the apparatus that a driver in an ordinary frame of mind will naturally operate the low signal, but when excited, will operate the louder signal.

I also aim to improve the mechanical details of the signaling device.

These and other objects of my invention, and the invention itself, will be best understood when taken in connection with the accompanying drawing and the detailed specification illustrating one specific embodiment of my invention, while the scope will be more particularly pointed out in the appended claims.

I regard the invention disclosed in this application as an improvement on that disclosed in my application 576855, Aug. 10, 1910, in which are made broad claims covering the device here disclosed.

Figure 1. is a diagram of the circuit and essential parts of the signaling device. Fig. 2 is an end elevation of the device itself with the cover removed. Fig. 3 is a cross section taken through the device.

Referring now to the drawings and to the particular embodiment of my invention there shown, the frame is illustrated at F. Upon the front of this frame, a frame plate *f* is fastened by screws *a*. This plate constitutes a horn front on the front wall of the chamber in which the sound producing apparatus is housed. This frame plate is perforated forming an opening therein for the passage of sound waves, and an amplifying horn 1 preferably attached to the plate at this perforation. A vibratile member 2, which is here shown as a diaphragm, is clamped between the frame and frame plate. A stem or lug 3, may be attached to the center of this diaphragm and vibrates therewith. A cover 23 incloses the various parts of the device when attached to the frame F.

At M is shown means for actuating the member 2 to cause the same to sound a signal. This is here shown as an electromagnet. 4 is the core of this magnet and 5 the windings.

At 6 is shown the armature of the electromagnet fastened by a leaf spring 7, to the frame F by fastening means 8. A spring contact 9 is associated with this armature and adapted to vibrate therewith. A catch 10 is fastened to one end of the armature and has a projecting part 10' which lies over the end of the spring 9, limiting the movement of the spring. The contact spring 9, is adapted to engage an adjustable contact 11, mounted in a portion F' of the frame. When the armature is vibrated by the magnet, the contacts 9 and 11 alternately engage and disengage to complete and interrupt a circuit through the coil 5, as will be described later. When the contacts are closed, the connection between the spring 9 and armature admits of free movement between these members after the contact member 11 is engaged, thus preventing the parts being injured by the full force of the armature, driving the contact 9 against 11.

12 and 13 are the binding posts which are fastened in the frame F.

At B I show a source of electric current, here shown as a battery, though any source may be employed.

At S is shown a circuit controller.

The binding post 12 is connected to the electromagnet by a conductor 15 which leads on to the contact 11. The contact 9 is connected to the binding post 13 by a conductor 16. The binding posts are connected to the source B and the controller S by conductors 14 and 17. The form of controller shown in the drawing consists of three springs, 20, 21 and 22. A push button 30, is mounted upon the upper spring 20 which is connected to the binding post 12 by the conductor 14. A current modifying device here shown as a resistance device is associated with the horn preferably connected in the circuit. The contact 22 is connected by a conductor 31 to the source B. This circuit controller S is adapted to assume three different positions. A first or normal position in which the circuit is broken and no signal sounded. This is the position shown in Fig. 1; a second position in which the springs 20 and 21 engage closing a circuit through the battery B and the resistance coil 18. In this position the low signal will be sounded, since the magnet is energized by a current which has been reduced by the resistance coil 18 and when the button 30 is pushed to its way down position, the springs 21 and 22 will be in contact with each other and the resistance coil 18 will be short circuited so that the magnet will be energized by the full strength of the current flowing from the battery. The amplitude of the vibration of the diaphragm will depend upon the strength of current which flows through the magnet. The loudness of the signal being dependent upon the amplitude of vibrations, I may increase the intensity of the signal by the means shown.

The operation of my device is as follows: To sound the low signal, push button 30 is operated until springs 20 and 21 engage. The magnet will be energized by a current from the source B through the circuit now including the resistance coil 18. The magnet will attract its armature 6 which will beat upon the stem 3, causing the diaphragm 2 to vibrate. The circuit will be broken at 9—11 and the magnet deënergized. The spring 7 will restore the armature to its normal position closing the circuit again. This cycle will be repeated as long as the circuit is closed at the circuit controller S. To sound a louder signal, the push button is pushed to its way down position, when the coil 18 will be eliminated from the circuit. When a driver is excited, it will be natural for him to push the button to the ultimate position, sounding the louder signal.

At A I show a portion of an arm through which the device is supported.

At 24 I show a tension screw for the adjustable contact 11.

It will be apparent that I may employ any form of horn or resonator and that the same may be omitted entirely if desired; that I may change the character of the signal produced by changing the character of the sound as desired; that any form of device may be employed to modify the operation of the vibratile member to so modify the character of the signal.

Obviously, I may employ a device which is capable of producing more than two different toned signals and may otherwise depart from the forms and details of the apparatus here shown without departing from the spirit of this invention, the same being herein shown solely for the purpose of clearly illustrating one specific embodiment.

I claim—

1. In a signaling device, the combination of an amplifying horn, a sound producing device associated therewith, means adapted to cause said device to sound a signal, a second device adapted to alter the action of said means upon said first named device whereby the same may be actuated to sound a second and different signal, and means common to said first named means and said second device controlling said first named means and said second device.

2. In a signaling device, the combination of an amplifying horn, a vibratile member associated therewith, means adapted to cause said member to vibrate to sound a signal, a device associated with said means adapted to alter the action of said means upon said member whereby the same may be actuated to sound a second and different signal, and means common to said first named means and said device for controlling said first named means and said device.

3. In a signaling device, the combination of an amplifying horn, a vibratile member associated therewith, electrically controlled means adapted to cause said member to vibrate to sound a signal, means to alter the action of said electrically controlled means upon said member whereby the same may be vibrated to sound a second and different signal, and means common to said electrically controlled means and said modifying means for controlling said electrically controlled means and said modifying means.

4. In a signaling device, the combination of an amplifying horn, a vibratile member associated therewith, an electromagnet adapted to cause said member to sound a signal, a circuit containing a source of current over which said magnet is energized, means in said circuit for changing the strength of current from said source, whereby the action of said magnet on said member is altered, so that the same produces a second and different signal, and a circuit controller common to said electromagnet and said means for closing a circuit through said magnet and said means and for eliminating said means from said circuit.

5. In a signaling device, the combination of a vibratile member, an electromagnet to vibrate said member to cause said member to produce a signal, a circuit over which said means is energized, a source of current, a current reducing device in said circuit and means for jointly controlling said circuit and for eliminating said current reducing means from said circuit.

6. In a signaling device, the combination of a vibratile member, an electromagnet adapted to act upon said member to cause the same to sound a signal, a source of current, a circuit, including said magnet and said source, a multi-position switch in said circuit, a current modifying device adapted to be connected in said circuit when said switch is in one of said positions and to be eliminated therefrom when said switch is in another of said positions whereby said magnet is energized by currents of different strength and said member is caused to sound different signals.

7. In a signaling device of the class described the combination of a vibratile member, an electromagnet adapted to cause said member to sound signals, a source of current, a circuit in which said source and magnet are connected, a three position switch associated with said circuit, a current modifying device, said switch having a normal or open position in which said circuit is interrupted, a second position in which said current modifying device is included in said circuit and said magnet is energized by a relatively weak current to cause said member to sound a soft signal and a third position in which said device is eliminated from said circuit and said magnet energized by a relatively strong current to cause said member to sound a loud signal.

8. In a signaling device, the combination of a casing, a vibratile member associated therewith, means to cause said member to sound a signal, a device for modifying the action of said means upon said member whereby said member is caused to vibrate upon amplitudes of different magnitude, thus producing signals of different degrees of loudness and means common to said first named means and said modifying device for controlling the actuations of said first named means on said member and the action of the modifying device on the first named means.

9. In a signaling device of the class described, the combination of a means adapted to produce a signal when actuated, electrically controlled means for actuating said first named means, a circuit over which said electrically controlled means is governed, a source of current in said circuit, a switch adapted to open and close said circuit, a plurality of contacts constituting a part of said switch, a resistance device connected between two of said contacts, and adapted to be included in said circuit when said switch is in a certain position and to be excluded therefrom when said switch is in another position.

10. In a signaling device of the class described, the combination of a vibratile member adapted when vibrated to sound signals, electromagnetic means adapted when actuated to vibrate said member, a source of current to effectively actuate said means, circuit conductors associating said source and said means, a device for modifying the effects of said source upon said means, a circuit controller in said circuit for connecting said device and for eliminating said device from said circuit, said circuit being open and said means unactuated when said circuit controller is in normal condition.

11. In a signaling device, the combination of signal producing means, electro magnetic means for actuating said signal producing means, a source of current, a circuit associating said source with said electromagnetic means, a current modifying device associated with said circuit, and a circuit controller normally interrupting said circuit, for connecting said current modifying device in circuit with said magnet and for shunting said current modifying device from said circuit.

12. In a signaling device of the class described, the combination of a vibratile diaphragm adapted when vibrated to produce signals, electromagnetic means for vibrating said diaphragm and causing said diaphragm to produce signals of different characters, a source of energy for driving said electromagnetic means, circuit connections associating said source and said means, a resistance device associated with said circuit connections and a circuit controller opening said circuit when in normal position and adapted when operated to a second position to connect said resistance device in said circuit connections and when operated to a third position to eliminate said resistance device from said circuit connections.

13. In a signaling device of the class described, the combination of a sound producing device, means adapted to cause said device to sound a signal, a second device adapted to modify the action of said means upon said first named device whereby the same may be actuated to sound a second and different signal and controlling means for governing the modifying device, said first named means being unoperated when said controlling means is in normal position.

In testimony whereof I affix my signature in the presence of two witnesses.

RAY H. MANSON.

Witnesses:
WM. W. DEAN,
F. O. RICHEY.

DISCLAIMER.

1,016,699.—*Ray H. Manson*, Elyria, Ohio. SIGNALING DEVICES. Patent dated February 6, 1912. Disclaimer filed December 10, 1915, by the inventor and the assignee by mesne assignments, *The Garford Manufacturing Company*.

Enter this disclaimer—

"To the claims in said patent, which are in the following words:

"1. In a signaling device, the combination of an amplifying horn, a sound producing device associated therewith, means adapted to cause said device to sound a signal, a second device adapted to alter the action of said means upon said first named device whereby the same may be actuated to sound a second and different signal, and means common to said first named means and said second device controlling said first named means and said second device.

"2. In a signaling device, the combination of an amplifying horn, a vibratile member associated therewith, means adapted to cause said member to vibrate to sound a signal, a device associated with said means adapted to alter the action of said means upon said member whereby the same may be actuated to sound a second and different signal, and means common to said first named means and said device for controlling said first named means and said device.

"3. In a signaling device, the combination of an amplifying horn, a vibratile member associated therewith, electrically controlled means adapted to cause said member to vibrate to sound a signal, means to alter the action of said electrically controlled means upon said member whereby the same may be vibrated to sound a second and different signal, and means common to said electrically controlled means and said modifying means for controlling said electrically controlled means and said modifying means.

"4. In a signaling device, the combination of an amplifying horn, a vibratile member associated therewith, an electromagnet adapted to cause said member to sound a signal, a circuit containing a source of current over which said magnet is energized, means in said circuit for changing the strength of current from said source, whereby the action of said magnet on said member is altered, so that the same produces a second and different signal, and a circuit controller common to said electromagnet and said means for closing a circuit through said magnet and said means and for eliminating said means from said circuit.

"5. In a signaling device, the combination of a vibratile member, an electromagnet to vibrate said member to cause said member to produce a signal, a circuit over which said means is energized, a source of current, a current reducing device in said circuit and means for jointly controlling said circuit and for eliminating said current reducing means from said circuit.

"6. In a signaling device, the combination of a vibratile member, an electromagnet adapted to act upon said member to cause the same to sound a signal, a source of current, a circuit, including said magnet and said source, a multi-position switch in said circuit, a current modifying device adapted to be connected in said circuit when said switch is in one of said positions and to be eliminated therefrom when said switch is in another of said positions whereby said magnet is energized by currents of different strength and said member is caused to sound different signals.

"7. In a signaling device of the class described the combination of a vibratile member, an electromagnet adapted to cause said member to sound signals, a source of current, a circuit in which said source and magnet are connected, a three position switch associated with said circuit, a current modifying device, said switch having a normal or open position in which said circuit is interrupted, a second position in which said current modifying device is included in said circuit and said magnet is energized by a relatively weak current to cause said member to sound a soft signal and a third position in which said device is eliminated from said circuit and said magnet energized by a relatively strong current to cause said member to sound a loud signal.

"8. In a signaling device, the combination of a casing, a vibratile member associated therewith, means to cause said member to sound a signal, a device for modifying the action of said means upon said member whereby said member is caused to vibrate upon amplitudes of different magnitude, thus producing signals of different degrees of loudness and means common to said first named means and said modifying device for controlling the actuations of said first named means on said member and the action of the modifying device on the first named means.

"9. In a signaling device of the class described, the combination of a means adapted to produce a signal when actuated, electrically controlled means for actuating said first named means, a circuit over which said electrically controlled means is governed, a source of current in said circuit, a switch adapted to open and close said circuit, a plurality of contacts constituting a part of said switch, a resistance device connected between two of said contacts, and adapted to be included in said circuit when said switch is in a certain position and to be excluded therefrom when said switch is in another position.

"10. In a signaling device of the class described, the combination of a vibratile member adapted when vibrated to sound signals, electromagnetic means adapted when actuated to vibrate said member, a source of current to effectively actuate said means, circuit conductors associating said source and said means, a device for modifying the effects of said source upon said means, a circuit controller in said circuit for connecting said device and for eliminating said device from said circuit, said circuit being open and said means unactuated when said circuit controller is in normal condition.

"11. In a signaling device, the combination of signal producing means, electromagnetic means for actuating said signal producing means, a source of current, a circuit associating said source with said electromagnetic means, a current modifying device associated with said circuit, and a circuit controller normally interrupting said circuit, for connecting said current modifying device in circuit with said magnet and for shunting said current modifying device from said circuit.

"12. In a signaling device of the class described, the combination of a vibratile diaphragm adapted when vibrated to produce signals, electromagnetic means for vibrating said diaphragm and causing said diaphragm to produce signals of different characters, a source of energy for driving said electromagnetic means, circuit connections associating said source and said means, a resistance device associated with said circuit connections and a circuit controller opening said circuit when in normal position and adapted when operated to a second position to connect said resistance device in said circuit connections and when operated to a third position to eliminate said resistance device from said circuit connections.

"13. In a signaling device of the class described, the combination of a sound producing device, means adapted to cause said device to sound a signal, a second device adapted to modify the action of said means upon said first named device whereby the same may be actuated to sound a second and different signal and controlling means for governing the modifying device, said first named means being unoperated when said controlling means is in normal position."

[*Official Gazette, December 21, 1915.*]